United States Patent [19]
Ballinger

[11] 3,923,221
[45] Dec. 2, 1975

[54] BICYCLE CARRIER
[76] Inventor: James E. Ballinger, 290 Princeton Drive, Costa Mesa, Calif. 92626
[22] Filed: Oct. 7, 1974
[21] Appl. No.: 512,519

Related U.S. Application Data
[63] Continuation of Ser. No. 372,663, June 22, 1973, abandoned.

[52] U.S. Cl. ....... 224/42.03 B; 224/42.06; 224/42.4
[51] Int. Cl.² .......................................... B60M 9/10
[58] Field of Search ........... 224/42.03 B, 42.03 A, 42.03 R, 224/42.06, 29 R, 42.32, 42.4, 42.41, 42.45 R, 42.46 R; 214/450

[56] References Cited
UNITED STATES PATENTS
2,431,400  11/1947  Iverson .................... 224/42.03 B
3,275,206  9/1966   Croft ....................... 224/42.03 B
3,744,689  7/1973   Kjensmo .................. 224/42.03 B Primary Examiner—Frank E. Werner
Assistant Examiner—Jerold M. Forsberg
Attorney, Agent, or Firm—Poms, Smith, Lande & Glenny

[57] ABSTRACT

To secure a bicycle to the front or rear of an automobile or other vehicle, a set of flexible cables or cords are provided having bracket means at each of the ends thereof for removable attachment to selected points on the vehicle bumper and hood or trunk. The bicycle is oriented to lie parallel with the front or rear end of the vehicle, and a pair of wheel securing cables are looped around the lower portions of each bicycle wheel and attached to the vehicle bumper by the aforementioned brackets. An additional cable is provided for attachment to the bumper at a central point thereon and for passing upwardly and about a central body portion of the bicycle to a point of attachment to the vehicle, such as provided by an edge margin of the automobile trunk or hood. The cable holding the bicycle body is provided with spring means for tensioning the cable, and means for cinch-tightening to a tensioned condition which firmly holds the bicycle in place. As an alternative construction, there may be provided for each wheel a pair of short attachment cables, each having a loop at one end and a bracket at the other, the bracket being receivable through the loop to form a longer loop encircling the rim and tire at a point in the lower portion of the wheel, the bracket being then attachable to a marginal portion of the vehicle bumper. The set of cables and associated bracket means can be quickly removed from the vehicle, collapsed into a small package and carried in the trunk of the car or carried by the bicycle rider.

6 Claims, 7 Drawing Figures

U.S. Patent    Dec. 2, 1975    3,923,221
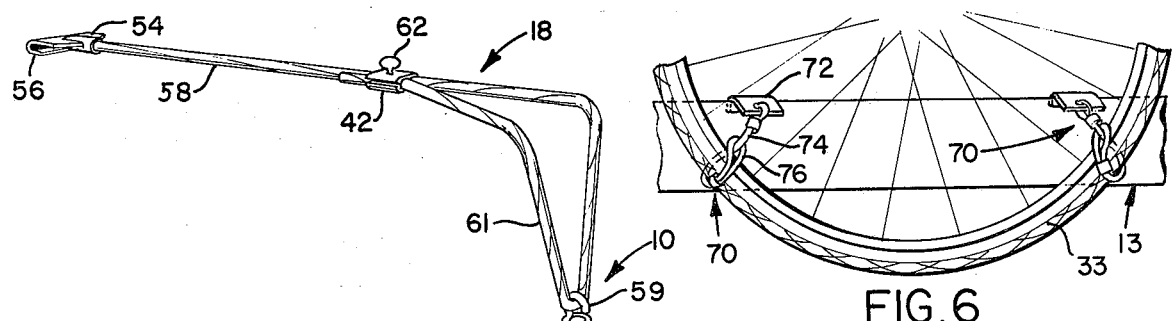
FIG. 6
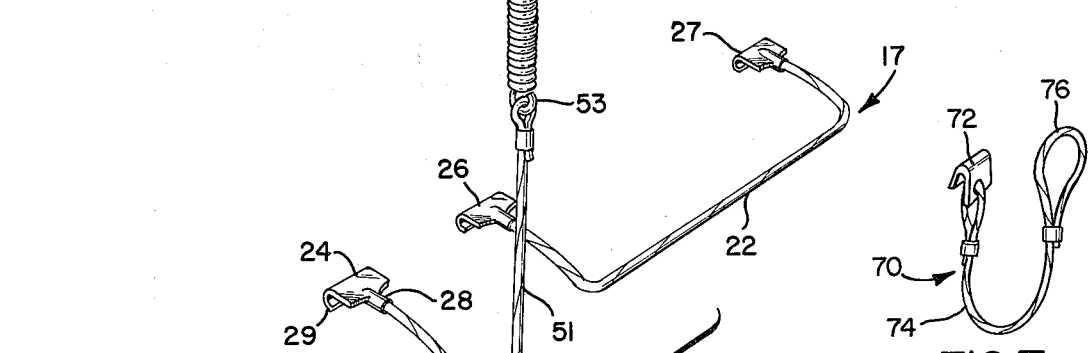
FIG. 1
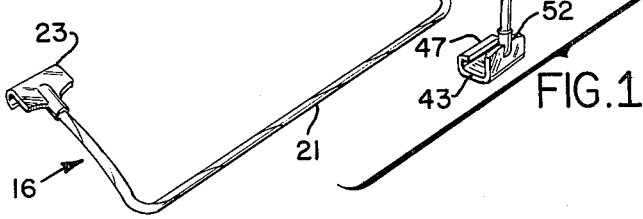
FIG. 7
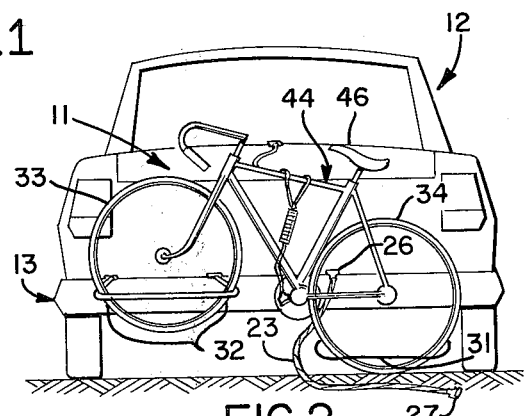
FIG. 2
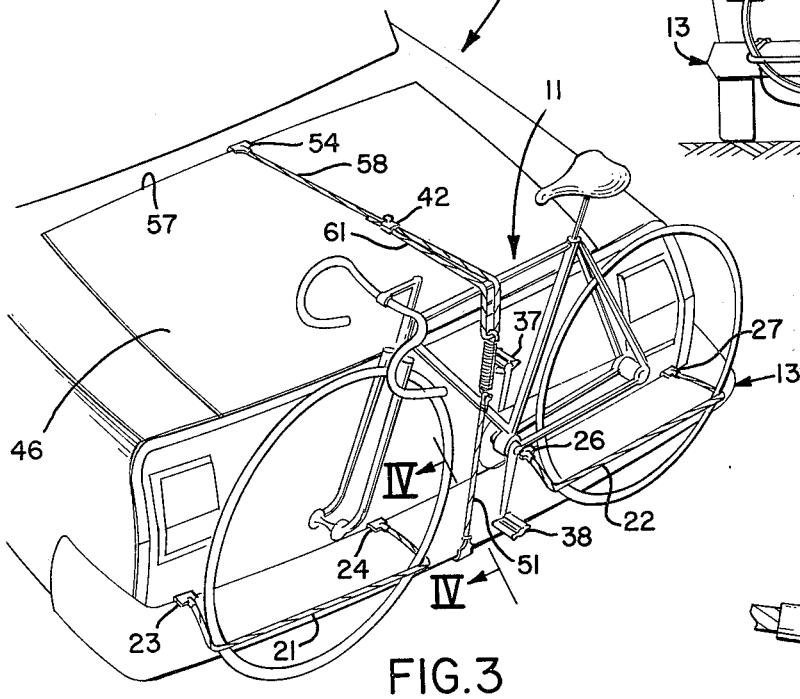
FIG. 3
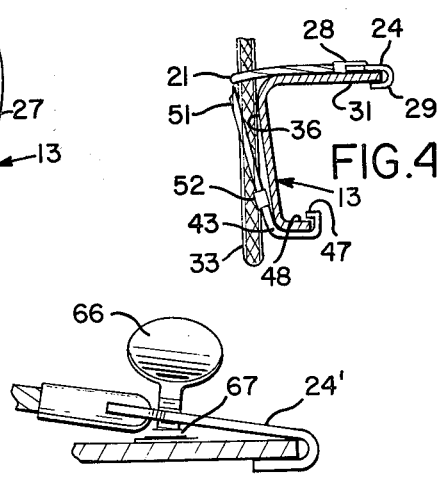
FIG. 4
FIG. 5

BICYCLE CARRIER

This is a continuation of application Ser. No. 372,663, filed June 22, 1973, now abandoned.

BACKGROUND:

In general, the present invention relates to bicycle accessories and more particularly to an apparatus for detachably mounting and carrying a bicycle on the front or rear of an automobile or other similar vehicle.

Along with the increased popularity of bicycling, there has been a large demand for bicycle carriers which are semipermanently fastened to a vehicle, usually a conventional passenger car, by which a bicycle may be transported to desired riding locations. These carriers are typically of a light-weight metal frame construction. Once attached to the vehicle, the time required to remove the carrier and the problem of where to store it, causes most people to leave the carrier on the car as a semipermanent accessory.

There are of course other bicycle carriers for vehicles; however, these devices, like the carrier mentioned above, are subject to certain disadvantages which the present invention overcomes. In particular, it is an object of the present invention to provide a simpler, light-weight, easily removable and collapsible carrier apparatus for transporting bicycles on ordinary passenger cars and other similar vehicles. In this regard, it is an advantage of the present invention that the carrier may be removed from the vehicle when not in use, and collapsed into a small package capable of being stored in the trunk of the vehicle, or even carried by the rider himself, either on his person or in a knapsack or other device attached to the bicycle.

It is another object of the present invention to provide a bicycle carrier which is capable of economical mass manufacture.

Still a further object of the present invention is to eliminate the need for a permanently or semi-permanently vehicle mounted bicycle carrier frame. In this regard, it is an advantage of the carrier of the present invention that it is not mounted on the car when not carrying a bicycle. This eliminates the need for the cumbersome and unsightly permanently mounted carriers in use today, which are typically left on the vehicle during periods of non-use.

Also, it is an object of the present invention to provide a bicycle carrier capable of being transported by the bicycle rider himself, and which may be attached to almost any conventional passenger vehicle which is available for transporting the bicycle. In other words, the bicycle rider is not limited to attaching his bicycle carrier to a particular vehicle, such as his own car, but may attach the carrier to a friend's car, a neighbor's automobile, etc.

SUMMARY

The present invention provides a set of flexible cables or cords having bracket means at one or both of their ends for removable attachment to selected points on the vehicle bumper and hood or trunk. The invention contemplates that the bicycle will be oriented in a substantially upright position, generally parallel with the front or rear end of the vehicle. The weight of the bicycle is carried by wheel support means, which may take one of two forms in accordance with the invention. In one form, a single cable having attachment brackets at each end is provided for each of the two wheels of the bicycle. Each of such cables forms a sort of cradle for its respective wheel, with the major portion of the length of the cable extending horizontally on the side of the wheel away from the vehicle on which it is mounted. The alternative form of the wheel support means includes a total of four cables, a pair for each of the two wheels of the bicycle, and each cable has at one of its ends an attachment bracket of the type mentioned above, and at its other end an enlarged loop through which the bracket may pass. In the use of this alternative form of wheel support means, the bracket end of the cable is led around the tire and rim, between adjacent spokes, and is passed through the loop, thus forming a larger loop around the tire and rim. The bracket is then attached to the adjacent bumper of the vehicle, as in the case of the first form of the invention. In each of the forms of the invention, an additional cable is provided for attachment to the bumper at a central point thereon and for passing upwardly and about a central body portion of the bicycle to a point of attachment to the vehicle, such as is provided by an edge margin of the vehicle trunk or hood. The cable holding the bicycle body is provided with spring means for tensioning the cable, and for cinch-tightening to a tension condition which firmly holds the bicycle in place. The set of cables and associated bracket means can be quickly removed from the vehicle and carried in the trunk of the car, or carried by the bicycle rider.

These and further objects and various advantages of the bicycle carrier according to the present invention will become apparent to those skilled in the art from a consideration of the following detailed description of illustrative forms of the invention.

BRIEF DESCRIPTION OF THE DRAWINGS:

Reference will be made to the appended sheet of drawings in which:

FIG. 1 is a perspective view of the bicycle carrier constructed in accordance with the present invention for removable attachment to the front or rear of a vehicle, particularly a passenger car, equipped with a front and/or rear bumper.

FIG. 2 is a rear elevation view of a passenger vehicle illustrating the manner in which the bicycle is mounted to the vehicle by means of the carrier shown in FIG. 1.

FIG. 3 is a perspective view showing the mounting of the bicycle by the carrier of FIG. 1, upon completing the mounting operations shown in progress in FIG. 2.

FIG. 4 is a vertical sectional view taken generally along the section lines IV—IV of FIG. 3.

FIG. 5 is an alternative preferred embodiment of one of the bracket means of the carrier shown in FIG. 1, equipped with a thumb screw lock for securing the brackets in place.

FIG. 6 is a fragmentary view of the lower portion of a bicycle wheel, showing the alternative form of wheel support means attached thereto for supporting that wheel.

FIG. 7 is a view on an enlarged scale of one of the wheel attachment cables of the alternative form of the invention.

DESCRIPTION OF EXEMPLARY EMBODIMENT:

With reference to the drawings, the particular embodiment of the present invention disclosed herein is illustrated in FIG. 1 and provides for mounting a bicycle 11 to the front or rear of a passenger vehicle 12, or similar vehicle, having a front and/or rear bumper 13.

Carrier 10 generally comprises a pair of bicycle wheel retaining cable means 16 and 17 and a bicycle body cable means 18 forming a set or combination of three cables attachable to the vehicle body and bumper for holding the bicycle in place as illustrated by FIG. 3. When in place, bicycle 11 is arranged in up-right juxtaposition with the front, or as in this case, the rear end of vehicle 12 with the lower portions of the bicycle wheels resting against the bumper 13.

The pair of wheel retaining cable means may be provided as shown in the present embodiment by flexible cables 21 and 22 having bracket means provided at each end for attachment to an upper margin of bumper 13. Although the bracket means associated with each of cables 21 and 22 may be of any suitable construction for attachment to bumper 13, in the present embodiment the bracket means are provided by plate-like members 23, 24, 26 and 27, each joined, as indicated at 28 for member 24 to the associated ends of cables 21 and 22. Opposite the cable connection, these plate-like members are formed with a re-entrant portion, as indicated by portion 29 of member 24, to define a hook configuration for detachable hooked engagement with a margin 31 of bumper 13 as best shown in FIG. 4. In this embodiment, margin 31 is provided by a horizontally extending upper marginal portion of bumper 13 having an edge which faces inwardly toward vehicle 12 such that the bracket means provided by members 23 and 24, and 26 and 27 support an outwardly or as in this case, a rearwardly directed force on the ends of cables 21 and 22.

With reference to FIG. 2, by this arrangement, each of the wheel cable means may be fastened to the upper margin of bumper 13 and passed around a lower portion 32 of each bicycle wheel 33 and 34. For example, as shown in FIG. 2, wheel 33 may be mounted in place first by attaching both of the bracket members 23 and 24 of cable means 16 and inserting the lower portion 32 of wheel 33 into an elongate, horizontal, wheel receiving loop bounded on one side by a rear wall 36 of bumper 13 and on the other side by cable 21.

The length of cables 21 and 22 is selected such that the above mentioned loop formed by the cable has a width commensurate with that of the wheel and a length which is smaller than the wheel diameter. This causes each wheel, such as wheel 33 to nest within the formed loop and receive both vertical and lateral support therefrom. This nesting of the wheel applies a tension force on cables 21 and 22 which is restrained by the hooked engagement of bracket members 23, 24, 26 and 27 with respect to bumper 13.

After mounting the wheel 33 in place, the remaining wheel 34 may be similarly secured by cable means 17 by first attaching bracket plate 26, passing cable 22 about the lower portion of wheel 34 and attaching bracket plate 27 to bumper 13.

During the mounting of bike 11, the pedals are rotated to locate them in whatever position the user selects to minimize the possibility of scratching the surface of the vehicle and to permit the bicycle to be carried with its wheels in a substantially vertical plane.

Cable means 18 which provides further support for the body of bicycle 11 is provided with fastening means at each end thereof for removable attachment to bumper 13 and a point on the body of vehicle 12 as illustrated. In this instance, the fastening means associated with cable means 18 is provided by plate-like bracket means similar to members 23, 24, 26 and 27. Associated with the cable means is a tensioning means, here in the form of an elongate coiled spring 41, and a cinch tightening means, here provided by a thumb screw cable clamp 42. With these features, a lower bracket member 43 is attachable to a lower margin of bumper 13 with cable means 18 being draped up and over a central body portion 44 of the bicycle to a point of attachment on the hood, or as in this case, the trunk 46 of vehicle 12. Once tensioned, cable means 18 provides additional lateral support of the bicycle body, holding it inwardly against the vehicle 12.

Bracket member 43 may be formed similarly to the cable bracket members, and accordingly is provided with a re-entrant portion 47 for hooked engagement with a lower margin 48 of bumper 13. As in the case of plate-like members 23, 24, 26 and 27 of the wheel support cable means, bracket member 43 may be suitably configured to adapt to many different bumper shapes and sizes. Opposite the re-entrant or hooked portion 47 of bracket member 43 it is joined to a first section of cable 51 as indicated at 52, while the opposite end of the cable is connected to a lower end 53 of spring 41.

At the other end of cable means 18, a fastening means is provided for attachment to the body of vehicle 12, and it has been found that in most cases a bracket formed similarly to the wheel cable bracket plates may be employed for attachment to a margin of either the vehicle trunk or hood. In this particular embodiment, a plate-like bracket member 54 is provided with a re-entrant portion 56 for hooked attachment to a forward margin or edge 57 of vehicle trunk 46. A similar attachment is available in most cases for a rearward margin or edge of a vehicle hood, however, such an attachment is an obvious modification of the present disclosure and accordingly is not shown.

In the alternative, a fastening means can be provided in place of bracket member 54 in the form of a suction cup device of well-known construction for providing a point of anchorage on the vehicle hood or trunk or even the top of the car. Thus in general, the point of anchorage provided in this instance by bracket 54 may be accomplished by any suitable fastening means, so long as it is readily detachable from the vehicle.

The remaining portions of cable means 18 may be provided by a second section of cable 58 joined at one end to bracket member 54 and having a slip connection with an upper end 59 of spring 41 as illustrated in FIG. 1. The free end of the cable is passed through the slip connection at end 59 of the spring and doubled back on itself to form a third section of cable 61, the end of which is selectively fastened to the second section of cable 58 at selected locations therealong by cable clamp 42.

Thus clamp 42 may be loosened by a thumb screw 62 and second and third cable sections 58 and 61 adjusted to cinch tighten cable means 18, simultaneously tensioning spring 41, whereupon cable clamp 42 may be re-secured by thumb screw 62. This provides a positive, constant tension in cable means 18 for holding the bicycle positively and firmly to the vehicle.

In the alternative, cable clamp 42 may be replaced by a one-way slip through tensioning buckle or the like, as well known, to provide for cinch tightening of cable sections 58 and 61. As a further alternative, cable means 18 may be provided by a stretchable, elastic cord of the type used for fastening or securing books to a bicycle carrier. This cord material is sometimes referred to as bungee. With such a stretchable cord, the spring 41 which provides the tensioning means in the present embodiment, can be eliminated, such that the cord forms both the cable and tensioning means.

Also, if desired, the wheel retaining cables 21 and 22 may be formed of such a stretchable cord. Alternatively, the various cables may be provided by a plastic sheathed, multistrand steel cable, where the plastic sheath serves to protect the bicycle parts from damage and scratching.

When the bicycle carrier is not in use, it may be collapsed into a small bundle, and carried in the trunk of the vehicle in a bag provided for the purpose. If desired, the carrier collapses to a sufficiently small size such that it may be transported by the bicycle rider, so as to be available for attaching his bike to a car at any desired time.

In some cases it may be desirable, although it has not been found necessary, to provide a thumb screw lock or similar locking feature for the various cable brackets. Thus FIG. 5 illustrates an alternative embodiment for the plate-like bracket members 23, 24, 26 and 27, in which a thumb screw lock is provided. Accordingly, with primed reference numerals referring to corresponding parts in FIGS. 1 through 4, bracket member 24' is provided with a thumb screw 66 threaded into a transverse opening provided in a central portion of member 24'. The end of screw 66 opposite its head is provided with a pad 67 which presses against the upper surface of margin 31 of bumper 13 in this instance to lock bracket member 24' in place. Each of members 23, 24, 26 and 27 of the wheel retaining cables may be provided with such a thumb screw lock, and similarly bracket members 43 and 54 may be so provided if desired.

An alternative form of wheel support means is shown in operative position in FIG. 6, and one of the attachment cables is shown in greater detail in FIG. 7. Thus, an attachment cable indicated generally at 70 is provided at one end with a bracket 72, which is desirably of the same type as is exemplified by brackets 23, 24, 26 and 27 previously mentioned, and the cable 74 forming the major portion of the length of attachment means 70 is provided at its other end with an enlarged loop 76, of sufficient size to permit bracket 72 to pass therethrough.

Use of the alternative form of wheel support means will be understood by reference to FIG. 6, showing two of such support means in position on a wheel. In the left-hand portion of FIG. 6, one of the attachment means 70 is shown with its cable portion 74 adjacent to bracket 72 passing through loop 76, the bracket being mounted in attached relation with the upper edge of vehicle bumper 13. As will be seen, the attachment means 70 is formed to provide an enlarged loop encircling the tire and rim of the wheel, between adjacent spokes of the wheel.

In the right-hand portion of FIG. 6 a second attachment means 70 serves the same purpose as the first attachment means 70 just described, and is desirably disposed approximately symmetrically relative to the first attachment means.

For some applications the form of the invention shown in FIGS. 6 and 7 is preferable, both from the standpoint of ease of attachment by the user, as well as greater security in use, since failure or inadvertent loosening of one of the brackets will not permit the bicycle to fall from the vehicle.

While only a limited number of embodiments of the present invention have been disclosed herein, it will be readily apparent to persons skilled in the art that numerous changes and modifications may be made thereto without departing from the spirit of the invention. Accordingly, the foregoing disclosure and description thereof are for illustrative purposes only and do not in any way limit the invention which is defined only by the following claims.

I CLAIM.

1. A bicycle carrier for removable attachment to either the front hood and bumper or rear trunk lid and bumper of a vehicle, comprising in combination:

a pair of bicycle wheel retaining cable means, one for each bicycle wheel, each having bracket means at the ends thereof for removable fastening to an upper margin of the vehicle bumper and for passing around a lower portion of each bicycle wheel with the bicycle in an upright orientation adjacent the front or rear of the vehicle;

each cable having a length selected to form in conjunction with the adjacent bumper to which it is attached a wheel receiving, elongate horizontal loop bounded on one side by said cable with a width commensurate with that of the wheel and a length smaller than the diameter of the wheel, such that each wheel is supported in both lateral and vertical directions;

bicycle body cable means having fastening means at the end thereof for removable attachment at one end to a lower margin of said vehicle bumper and for passing upwardly therefrom around a central body portion of the bicycle to a point of attachment at the opposite end of the cable means to the hood or trunk of the vehicle; and tensioning means associated with said body cable means for applying a constant restraining force to the bicycle for keeping the wheels of the bicycle under tension downwardly in said loops, and means for adjusting said tensioning means.

2. The carrier of claim 1, each said bracket means of said wheel cable means comprising:

a plate-like member connected to said cable means adjacent one edge and formed with a re-entrant portion for hooked engagement with said bumper margin.

3. The carrier of claim 2, wherein said re-entrant portions of said bracket means plates are adapted for hooked attachment to an inwardly facing edge of an upper horizontally extending margin of said bumper to support an outwardly directed force on said cables caused by the wedging of the lower wheel portions between the cables and the adjacent bumper.

4. The carrier of claim 1, wherein said adjusting means for cinch tightening of said body cable comprises means to enable said tensioning means to apply said constant tensioning for firmly holding said bicycle.

5. The carrier of claim 4, wherein said tensioning means is provided by a coiled spring and said body support cable means is comprised of a first section of cable connected between one of said bracket means and a lower end of said spring, and a second section of cable having one end connected to the remaining bracket means and the other end having a slip connection with the upper end of said spring and doubled back as a third section of cable, and a fastening means selectively securing the free end of said third section of cable at selected locations along said second cable section to provide said cinch tightening means.

6. The carrier of claim 1, said fastening means of said body cable means comprising a first bracket member for removable attachment to a lower margin of said vehicle bumper and a second bracket member for removable attachment to a marginal edge of either the hood or trunk lid of the vehicle depending upon the vehicle end at which the bicycle is mounted.

* * * * *